US006571896B2

(12) United States Patent
Roberts

(10) Patent No.: US 6,571,896 B2
(45) Date of Patent: Jun. 3, 2003

(54) MECHANIZED WALKER

(76) Inventor: Kevin L. Roberts, 4448 Anderson Ave., St. Louis, MO (US) 63115

(*) Notice: Subject to any disclaimer, the term of this patent is extended or adjusted under 35 U.S.C. 154(b) by 0 days.

(21) Appl. No.: 09/898,598

(22) Filed: Jul. 3, 2001

(65) Prior Publication Data

US 2003/0010546 A1 Jan. 16, 2003

(51) Int. Cl.[7] .................................................. B60K 1/00
(52) U.S. Cl. .................. 180/65.1; 180/907; 297/DIG. 4
(58) Field of Search ....................... 280/87.021, 87.041; 180/65.1, 65.2, 907; 297/DIG. 4, DIG. 10, 5; 108/143, 5

(56) References Cited

U.S. PATENT DOCUMENTS

| | | | | | |
|---|---|---|---|---|---|
| 3,279,567 | A | * | 10/1966 | Kempel | 135/66 |
| 4,029,311 | A | * | 6/1977 | Chanslor et al. | 188/29 |
| 4,384,713 | A | * | 5/1983 | Deutsch et al. | 188/167 |
| 4,461,471 | A | * | 7/1984 | Brastow | 135/67 |
| 4,632,451 | A | * | 12/1986 | Lee | 108/137 |
| 4,736,689 | A | * | 4/1988 | Stanko | 135/67 |
| 4,768,536 | A | * | 9/1988 | Hawkins | 180/65.5 |
| 4,907,794 | A | * | 3/1990 | Rose | 135/67 |
| 5,170,810 | A | * | 12/1992 | Chapin | 108/47 |
| 5,253,724 | A | * | 10/1993 | Prior | 180/6.5 |
| 5,273,063 | A | * | 12/1993 | Farr et al. | 135/66 |
| 5,366,036 | A | * | 11/1994 | Perry | 180/6.5 |
| 5,445,174 | A | * | 8/1995 | Cunningham | 135/66 |
| 5,647,602 | A | * | 7/1997 | Nevin | 135/67 |
| 5,730,255 | A | * | 3/1998 | Helmers | 188/19 |
| 5,778,996 | A | * | 7/1998 | Prior et al. | 180/65.1 |
| 5,853,219 | A | * | 12/1998 | Santuccio | 135/66 |
| 5,937,959 | A | * | 8/1999 | Fujii et al. | 180/12 |
| 5,944,338 | A | * | 8/1999 | Simpson | 280/47.38 |
| 6,154,690 | A | * | 11/2000 | Coleman | 180/65.1 |
| 6,163,249 | A | * | 12/2000 | Betcher, III | 135/65 |
| D441,694 | S | | 5/2001 | Kjell et al. | |

* cited by examiner

*Primary Examiner*—Brian L. Johnson
*Assistant Examiner*—Kelly E Campbell
(74) *Attorney, Agent, or Firm*—Polster, Lieder, Woodruff & Lucchesi, L.C.

(57) ABSTRACT

A walker has a frame with laterally spaced front vertical post members and laterally spaced rear vertical post members, with handle members extending between them. Wheels are mounted on the front vertical post members and gear motors, supported by the front vertical post members are connected to drive the wheels. At least one control mounted on or adjacent the handle members within reach of a person grasping the handles is connected to energize the motors when the control is actuated by the person. A motor-actuated tray assembly is mounted between the front vertical post members for pivotal movement between an orientation substantially vertical and an orientation substantially parallel to the surface on which the walker is resting. A lead screw assembly with a motor in at least one of the vertical post members is adapted to raise and lower the height of the handle members.

9 Claims, 4 Drawing Sheets

MECHANIZED WALKER

CROSS REFERENCE TO RELATED APPLICATIONS

Statement Regarding Federally Sponsored Research or Development

Not Applicable.

BACKGROUND OF THE INVENTION

Walkers are commonly used by people who have difficulty walking, or whose balance is impaired. Walkers without wheels must be lifted manually and moved forward in increments. Wheeled walkers are well known. They require being pushed. Most walkers are not equipped with a tray on which the user can put a food tray or food items, or which is useful as a desk. The walker shown in U.S. Design Pat. No. 441,694 S does show a wheeled walker with a tray. However, the tray limits the distance that a person using the walker can move forward in the walker. The walker shown in patent D Pat. No. 441,694 S also has a mechanical means for raising and lowering the handles with respect to the rest of the body of the walker, but that requires that someone loosen screws, and physically lift or lower the handlebar assembly. The device also includes a brake assembly.

One of the objects of this invention is to provide a wheeled walker with a power system for driving wheels, operated optionally, with controls conveniently arranged for the use of the person using the walker.

Another object is to provide such a walker with a power operated tray or shelf which can be moved to a position forward of the walker or rearwardly within the compass of the walker frame.

Still another object is to provide such a walker with power operated vertical height adjustment.

Other objects will become apparent to those skilled in the art in light of the following description and accompanying drawings.

SUMMARY OF THE INVENTION

In accordance with this invention, generally stated, a walker is provided with laterally spaced front vertical post members and handle members extending rearwardly from the vertical posts, wheels mounted on the vertical post members, motors mounted to drive the wheels and at least one control mounted within reach of a person grasping handles of the walker and connected to energize the motors when the control is actuated by the person. The walker includes a tray assembly mounted on the walker between the front leg posts for pivotal movement between an orientation substantially vertical and an orientation substantially parallel with a surface on which the walker is resting, and power means for moving the tray assembly from the substantially vertical position to the substantially parallel position and vice versa. The tray assembly includes a tray mounted on and between rails in such a way that the tray can be moved forward and backward when the assembly is in its horizontal position.

The walker preferably includes a power unit by which the handles of the walker are raised and lowered

DRAWINGS

DESCRIPTION OF THE PREFERRED EMBODIMENT

Figure 1:
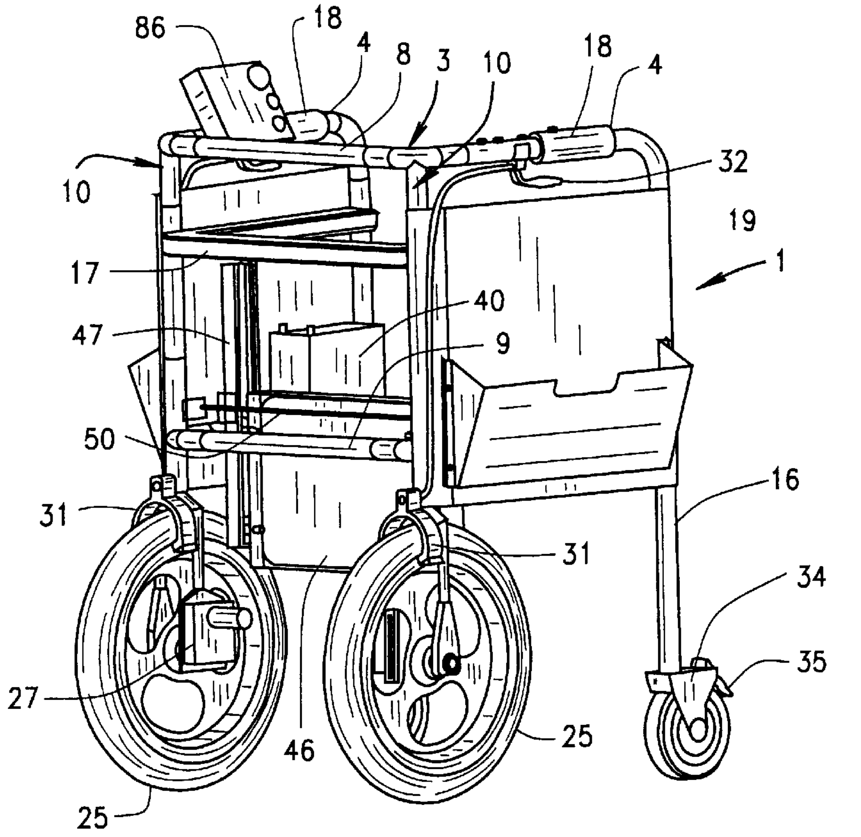
FIG. 1 is a view in front perspective, showing one illustrative embodiment of walker of this invention.
Figure 2:
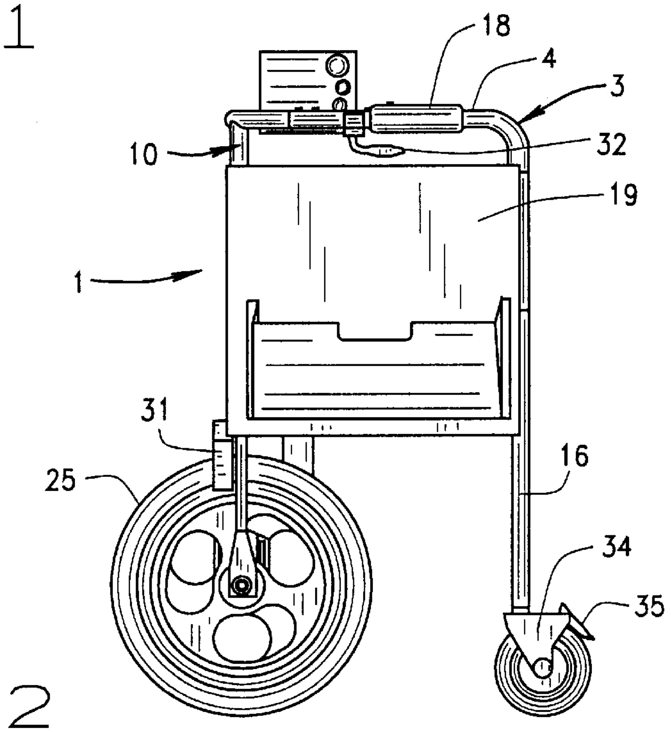
FIG. 2 is a view in side elevation of the walker.
Figure 3:
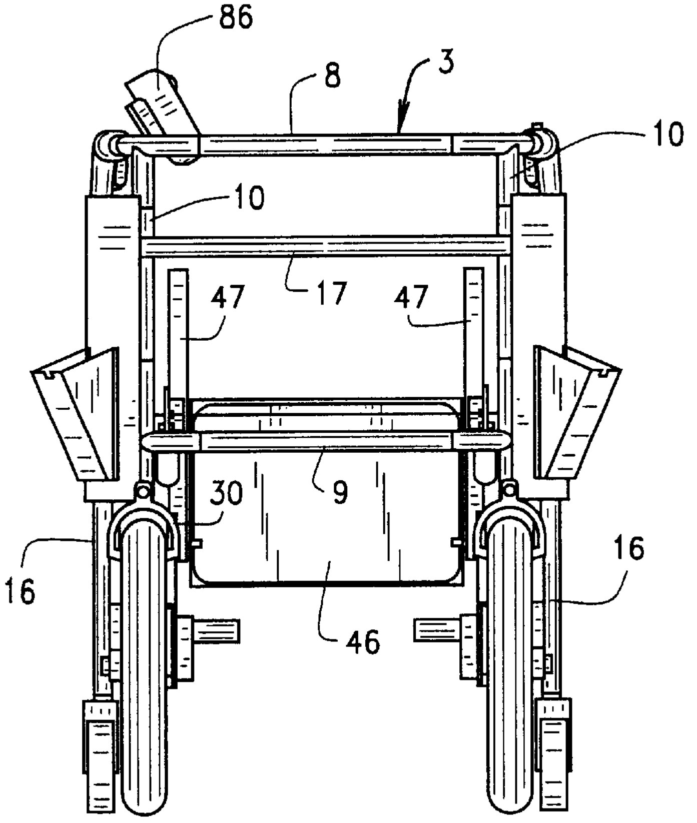
FIG. 3 is a view in front elevation of the walker.
Figure 4:
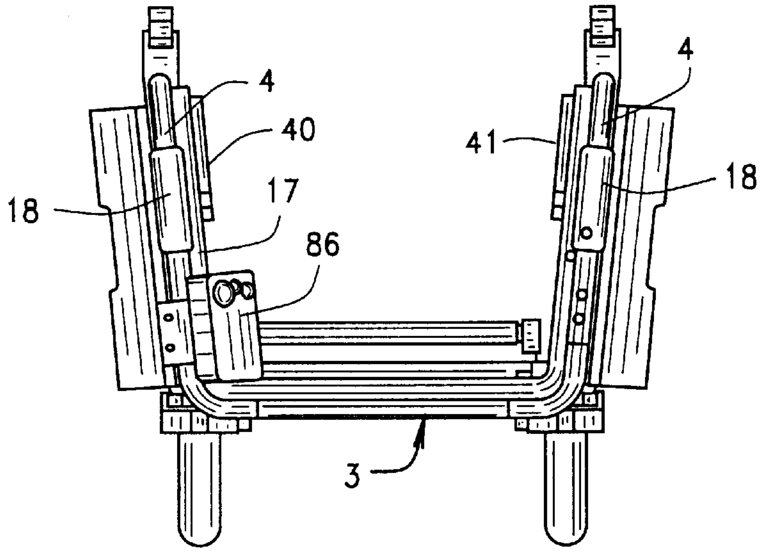
FIG. 4 is a top plan view of the walker.
Figure 5:
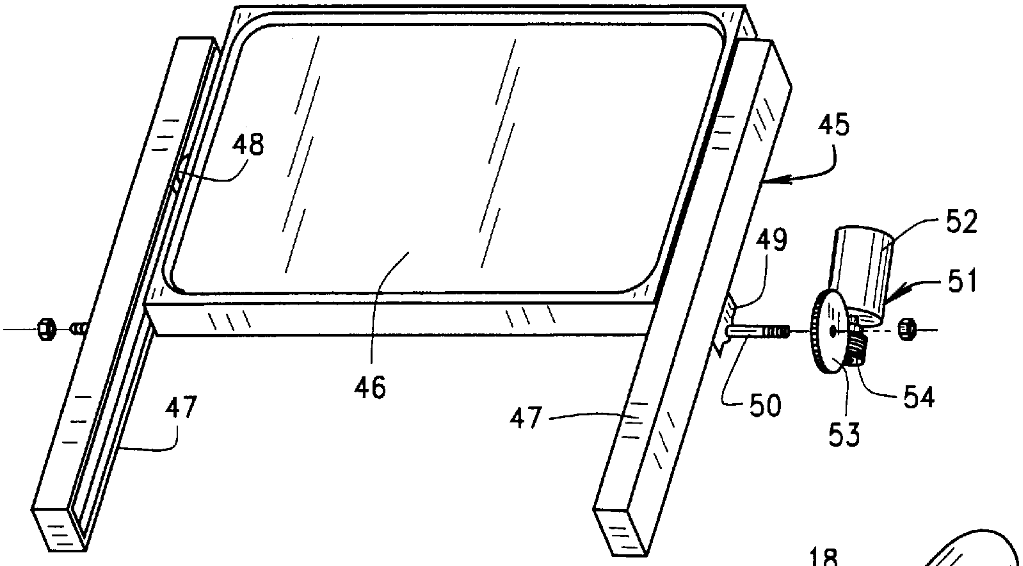
FIG. 5 is a detail perspective view of a tray assembly.
Figure 6:
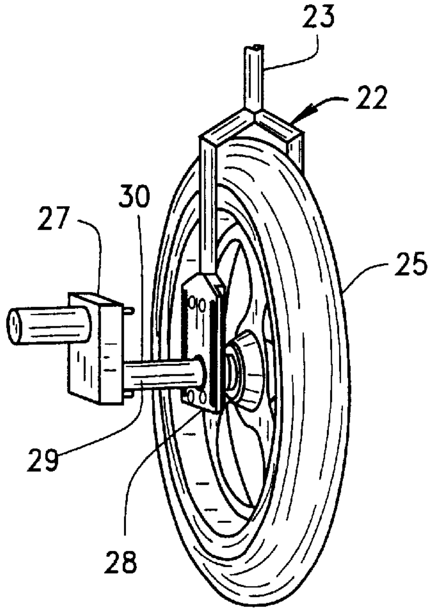
FIG. 6 is a fragmentary view in perspective, somewhat exploded, of a wheel assembly.
Figure 7:
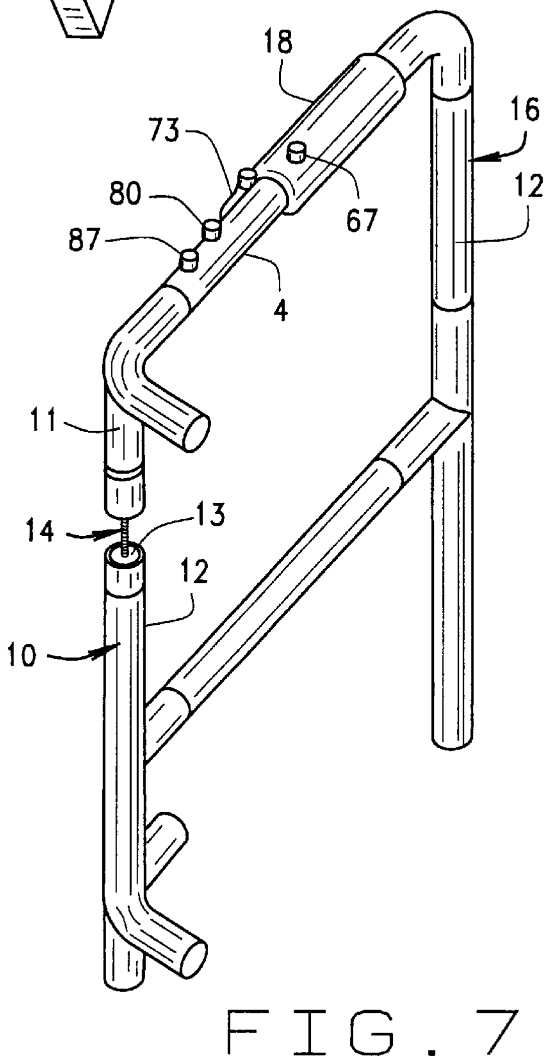
FIG. 7 is a view in perspective of a part of a tubular frame.

In the drawing, reference numeral 1 indicates the assembled walker of one embodiment of this invention. The walker includes a tubular frame 3, with handlebar sections 4 extending between a pair of laterally spaced front posts 10 and laterally spaced rear posts 16. A hand grip 18 is mounted on the handlebar section. An upper connecting bar 8 extends laterally between the front posts 10, as does a lower connecting bar 9. The front posts 10 have an upper telescoping section 11 adapted to slide over a central section 12. The central section 12 houses, in at least one of the front posts, a motor 13 which drives a lead screw assembly 14, by which the upper telescoping section 11, hence the handlebar section 4, is raised and lowered. Generally, an adjustment of 3 or 4 inches is sufficient, although it can be made greater or less. A limit switch stops the motor at the desired upper and lower limits of travel of the lead screw.

A U-shaped reinforcing member 17, preferably made of square tubing, extends between the front posts and rearwardly between the front and rear posts. Side panels 19 serve as privacy panels and also serve to reinforce the frame 3.

Wheel forks 22 have a stem 23 that extends into an open end of the front posts 10, where they are secured against rotation. Wheels 25 are mounted in the wheel forks. Gear motors 27 are mounted on gear motor brackets 28 fixed to the wheel forks. Each of the gear motors 27 is operatively connected to a wheel through a roller clutch 29. An inner race of the clutch 29 is fixed to the shaft of the motor. An outer race is fixedly mounted in a precision tubular shaft 30 that is keyed to its wheel, to drive the wheels when the motors are energized. The roller clutch is of the type in which rollers in a channel between a spiral wall and a cylindrical wall, are forced into engagement with the wall members in response to rotation of the spiral wall at a rate greater than that of the cylindrical wall. A slow movement in the opposite direction will not cause the rollers to engage frictionally to such an extent as to preclude that movement. Accordingly, when the motors are not energized, the walker can be moved rearwardly, slowly. In case of an emergency, the walker can be dragged back even if the front wheels are locked.

In the illustrative embodiment, caliper brakes 31 are provided which engage radial surfaces of the wheels in response to the squeezing of levers 32 mounted on the handlebar sections.

The rear posts 16 are longer than the front posts 10, to permit the front posts to accommodate larger wheels, for example 14" diameter wheels, than wheels of casters 34 (for example 5"), which are mounted on the rear posts. Pedal brakes 35 are mounted to engage the wheels of the casters 34.

Batteries 40, 41 are mounted on opposite sides of the frame, within the side panels 19.

A tray assembly 45 includes a tray 46, side channels 47, and rollers 48, mounted on the tray and engaging a surface of the channels 47. Brackets 49 are secured to the channels. A tray assembly shaft 50 extends between the channels, through the brackets 49, to which they are secured, and through mounting plates 44 fixed to the front posts 10 and extending rearwardly. A worm wheel 53 is secured to one projecting end of the shaft 50. The worm wheel 53 is a part of a worm assembly 51, which includes a motor 52 and a worm 54. The tray is positioned within the compass of the frame of the walker when in the generally vertical position. When the assembly is in the horizontal position, the tray can easily be moved, on the rollers 48, between a forward and a rearward position.

Figure 8:
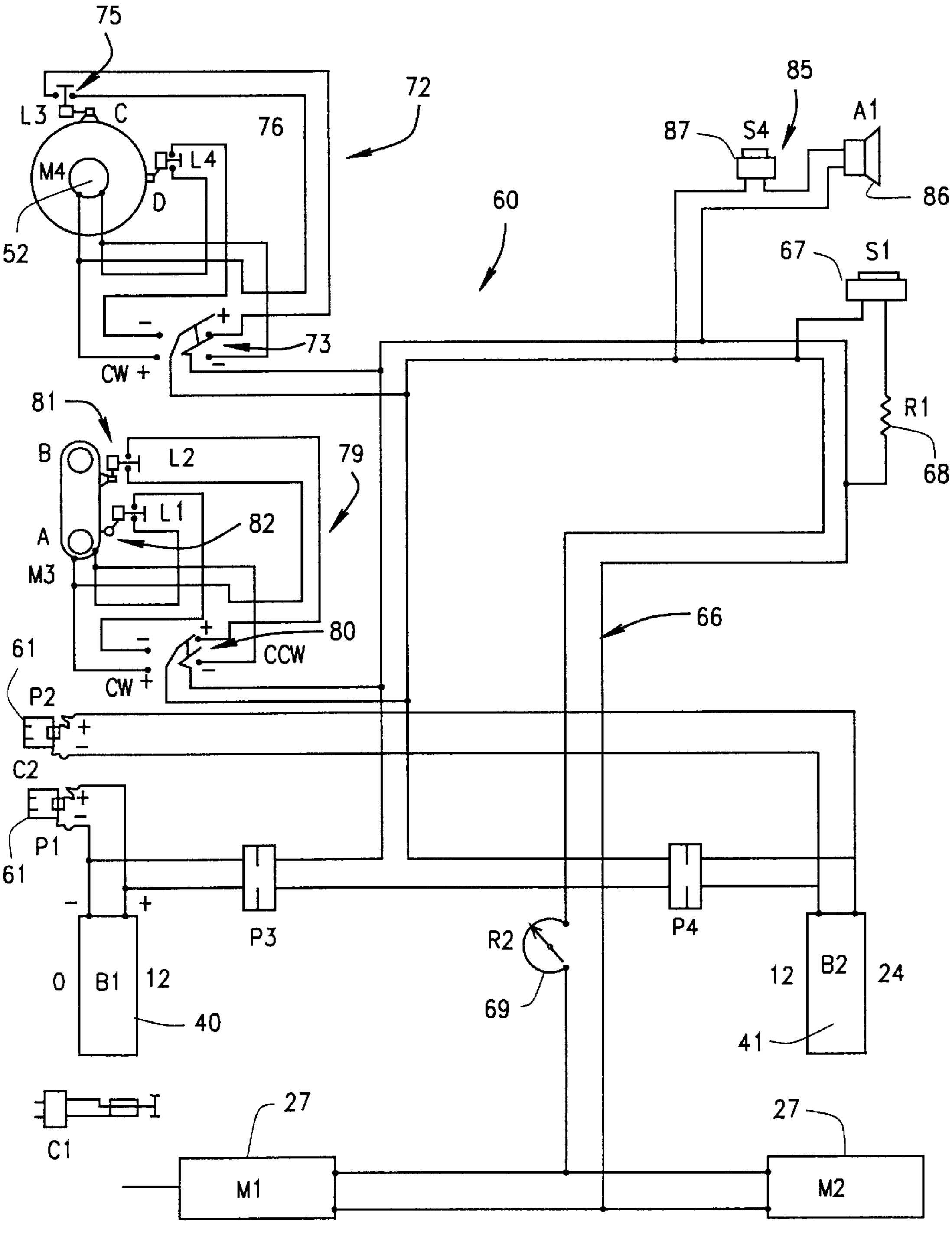
FIG. 8 is a circuit diagram of the electrical components of the walker.

Referring now to FIG. 8, an electric circuit 60 is illustrated somewhat diagrammatically. The circuit 60 includes batteries 40, 41, connected in series, and plugs 61 to receiver conductors connected to a source of power for recharging the batteries. A drive motor circuit 66 includes a switch 67, electrically connected to the batteries 40 and 41 and to motors 27, a resistor 68, a pulse generator 69, and the gear motors 27. If the motors 27 are direct current motors, the resistor 68 can be a variable resistor. If the motors 27 are A.C. motors, the pulse generator serves as a speed regulator. In either case, preferably, a speed of the motors that suits the user of the walker is determined, and left unchanged unless and until the user finds the speed unsuitable. The switch 67 is a double pole, single throw switch.

A tray circuit 72 includes a double pole double throw switch 73, electrically connected to the batteries 40 and 41 and to tray motor 52, and limit switches 75 and 76, associated with worm wheel 53 so as to break the circuit at the vertical and horizontal positions of the tray assembly. The switch 73 can be of the butterfly type, for easy manipulation.

A height adjustment circuit 79 includes a double pole double throw switch 80, electrically connected to the batteries 40 and 41 and to the motor 13, and upper and lower limit switches 81 and 82, respectively. The switch 80 can also be of the butterfly type.

An alarm circuit 85 includes an alarm 86, which can be audible or visual, or both, and a single pole, single throw switch 87, electrically connected to the batteries 40 and 41 and to the alarm. All of the switches 67, 73, 80 and 87 are biased to open position so as to break the circuit to their respective motors when they are not being physically depressed.

Various parts of the walker are available commercially, some of which are identified as follows:

| Description | Catalog | Stock No. |
|---|---|---|
| Worm Wheel (53) | PIC | Q9-28 |
| Worm (54) | PIC | Q10-2 |
| Tray Rollers | McMaster | 60135K11 |
| DC Gearmotor (27) | McMaster | 6409K27 |
| DC Motor (52) | McMaster | 6331K14 |
| Min. Lead Screw Assembly (14) | McMaster | 6642K2 |
| Casters (34) | McMaster | 90604A146 |
| Precision Tubular Shaft (30) | McMaster | 6657K24 |
| Roller Clutch (29) | McMaster | 6392K24 |

Numerous variations in the construction of the walker of this invention will occur to those skilled in the art in the light of the foregoing disclosure. Merely by way of illustration and not of limitation, height adjustment motor assemblies can be provided in both front posts, or in one or both rear posts or in both front and rear posts. Detents can be provided for holding the tray in position at the forward and rearward positions of the tray in the channels 47, or in an intermediate position, which detents can take the form of slots in the channels, into which the tray rollers can settle, or of ball detents, for example. The detents need not hold the tray tightly, but just enough to prevent unwanted shifting. The electric motors can be replaced with hydraulic motors, or, in the case of the height adjusting mechanism, with a hydraulic cylinder, all powered by a hydraulic pump. The tray assembly can be pivoted at any convenient height between the front posts. The tray can be moved by a power mechanism, as with a reversible electric motor and ratchet arrangement, or a hydraulic cylinder, for example. A clutch of a different type from the roller clutch can be employed. For example, a friction clutch controlled by a lever manipulable by the user of the walker can be provided, so that it can be selectively engaged or disengaged at any time, whether the motor is running or not. If the clutch is biased toward engagement, releasing the clutch when the motor is not running will brake the walker against movement. A one-way clutch, engaging in the forward direction and releasing in the rearward direction of the wheels, can also be used. If a clutch different from the roller clutch or one-way clutch is used, the polarity of the drive motors can be selectively reversed, so as to drive the walker backward, if desired. The manual brakes can be so connected as to release the drive motor or motors from connection to one or both of the drive wheels when one or both of the brakes are applied. The various switches can be arranged differently, and some or all can be mounted on the other handle bar section from the one illustrated. These variations are merely illustrative.

Having thus described the invention, what is claimed and desired to be secured by Letters Patent is:

1. A walker comprising a frame with spaced front vertical post members and handle members extending rearwardly substantially horizontally from said front vertical post members; wheels mounted on said vertical post members; motors mounted on said frame and connected to drive said wheels, and a tray assembly mounted on said frame between said front vertical post members, including a tray with an outer free edge, for pivotal movement between an orientation at which said tray is substantially vertical with said free edge oriented downwardly and an orientation substantially parallel with a surface on which the walker is resting and within the compass of said handle members, parallel with and along said handle members, and power means for moving said tray assembly from said substantially vertical position to said substantially parallel position and vice versa, wherein the tray assembly comprises a tray member having parallel edges and channel members along said edges, said channel members supporting said tray for sliding movement toward and away from the rear of said frame said power means being connected to said channels.

2. The walker of claim 1 wherein said handle members are supported at a forward end by said front vertical posts and at a rearward end by rear vertical posts, said handle members having stems telescoping with an upper end of said posts, power operated means including a screw mechanism for raising and lowering the height of the handle members uniformly with respect to said posts, and control means, mounted on said frame, for energizing and deenergizing said power operated means.

3. The walker of claim 2 wherein the power operated means comprises an electric motor connected to drive a lead screw operatively connected to a sliding vertical tube part of the handle assembly, and the control means comprises a switch in an electrical circuit between said motor and a battery.

4. A walker comprising a frame with spaced front vertical post members and handle members extending rearwardly from said front vertical post members; wheels mounted on said front vertical post members; motors mounted on said frame and connected to drive said wheels individually, and a clutch mechanism between each of said motors and the wheel it drives, said clutch mechanism engaging in response to rotation of said motor at a rate in excess of that of said wheel in response to pushing of said walker by a user and disengaging in response to rotation of said wheel in response to pushing of said walker by a user at a rate greater than that of said motor.

5. The walker of claim 4 including a mechanical brake operatively connected to at least one of the driven wheels.

6. The walker of claim 4 wherein the motors driving the wheels are electric gear motors, and battery means are mounted on said frame and electrically connected to said motors through at least one switch.

7. The walker of claim 3 including a mechanical brake for each drive wheel, and means for disengaging the power means from the wheel or wheels to which the brake is associated when the brake is applied to that wheel.

8. The walker of claim 4 wherein the clutch automatically disengages the power means from the wheel when the motor is deenergized.

9. A walker comprising a frame with spaced front vertical post members and handle members extending rearwardly from said post members; wheels mounted on said vertical post members; electric gear motors mounted on said frame and connected to drive said wheels and battery means mounted on said frame and electrically connected to said motors through at least one switch mounted on said frame within reach of a person grasping said handles, said switch being biased toward deenergizing position, requiring that it be held in energizing position, so that when released, the switch deenergizes the drive motors; a clutch mechanism between said motors and the wheels, said clutch mechanism automatically disengaging the power means from the wheels when the motor is deenergized; a tray assembly mounted on said frame for pivotal movement between an orientation substantially vertical at the front of said frame and an orientation substantially parallel with a surface on which the walker is resting, and power means for moving said tray assembly from said substantially vertical position to said substantially parallel position and vice versa, said tray assembly comprising a tray member having parallel edges and channel members along said edges, said channel members supporting said tray for sliding movement toward and away from the rear of said frame, said tray member being supported on each side along a shelf of said channel by anti-friction bearings and extending within the compass of the handle members when the tray member is in its rearmost position, means for releasably holding the tray in its rearward position; a mechanism for raising and lowering the height of the handle members comprising an electric motor electrically connected to said battery means and mechanically connected to turn a lead screw connected to a sliding vertical tube that is part of said handle member assembly; control means, mounted on said frame, for energizing and deenergizing said lead screw motor, and alarm means mounted on said frame and connected to said battery means by way of a switch mounted on said frame within reach of a person using the walker.

* * * * *

UNITED STATES PATENT AND TRADEMARK OFFICE

CERTIFICATE OF CORRECTION

PATENT NO. : 6,571,896 B2
DATED : June 3, 2003
INVENTOR(S) : Kevin L. Roberts

It is certified that error appears in the above-identified patent and that said Letters Patent is hereby corrected as shown below:

<u>Column 5,</u>
Lines 19-22, replace "7. The walker of claim 3 including a mechanical brake for each drive wheel, and means for disengaging the power means from the wheel or wheels to which the brake is associated when the brake is applied to that wheel." with -- 7. The walker of claim 3 including a mechanical brake for each wheel, and means for disengaging the motor simultaneously from said drive wheel when the brake is applied to that wheel. --

Signed and Sealed this

Seventh Day of October, 2003

JAMES E. ROGAN
*Director of the United States Patent and Trademark Office*